United States Patent
Ikram Ul Haq

(10) Patent No.: US 11,342,871 B2
(45) Date of Patent: May 24, 2022

(54) ANGULAR POSITION ERROR ESTIMATION AT STANDSTILL FOR HIGH-FREQUENCY VOLTAGE INJECTION

(71) Applicant: ABB Schweiz AG, Baden (CH)

(72) Inventor: Omer Ikram Ul Haq, Surahammar (SE)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 17/231,708

(22) Filed: Apr. 15, 2021

(65) Prior Publication Data

US 2021/0328532 A1 Oct. 21, 2021

(30) Foreign Application Priority Data

Apr. 20, 2020 (EP) .................................... 20170391

(51) Int. Cl.
*H02P 21/18* (2016.01)
*H02P 21/22* (2016.01)

(52) U.S. Cl.
CPC .............. *H02P 21/18* (2016.02); *H02P 21/22* (2016.02); *H02P 2203/11* (2013.01)

(58) Field of Classification Search
CPC ...... H02P 21/18; H02P 21/22; H02P 2203/11; H02P 6/183
See application file for complete search history.

(56) References Cited

U.S. PATENT DOCUMENTS

| 10,224,851 B2 | 3/2019 | Huh et al. |
| 2008/0309268 A1 | 12/2008 | Morimoto et al. |

(Continued)

FOREIGN PATENT DOCUMENTS

| EP | 1653601 A1 | 5/2006 |
| EP | 1653601 A9 | 12/2006 |
| WO | 0025418 A1 | 5/2000 |

OTHER PUBLICATIONS

Silverio Bolognani, et al.; "Sensorless quasi-standstill and very low-speed position detection in non-salient PMSMs based on current injection and back-EMF observer"; Sensorless Control for Electrical Drives (SLED), 2012 IEEE Symposium On, IEEE; Sep. 21, 2012; 7 Pages.

(Continued)

*Primary Examiner* — Bickey Dhakal
(74) *Attorney, Agent, or Firm* — Whitmyer IP Group LLC

(57) ABSTRACT

According to an aspect, there is provided an apparatus for performing angular position error estimation. The apparatus operates (601) a synchronous motor (111) according to a pre-defined pulsating torque signal using a sensorless vector control method with high-frequency voltage injection. The pre-defined pulsating torque signal has a zero mean and corresponds to a torque operating point. The apparatus measures (602) a first value of an estimated angular position at a first time instance corresponding substantially to an end point of the pre-defined pulsating torque signal and second values of the estimated angular position and an estimated angular speed at a second time instance occurring after the first time instance. Based on the measured values, the apparatus estimates (603) an error in the estimated angular position and stores (604) the error to a lookup table. After performing said steps for one or more pre-defined pulsating torque signals, the apparatus operates (607) the synchronous motor (111) using the lookup table for angular position error correction.

15 Claims, 6 Drawing Sheets

(56) References Cited

U.S. PATENT DOCUMENTS

| | | | |
|---|---|---|---|
| 2011/0012544 A1* | 1/2011 | Schulz | B60L 15/08 318/400.33 |
| 2016/0141994 A1* | 5/2016 | Takase | H02P 21/22 318/135 |
| 2021/0273591 A1* | 9/2021 | Tobari | H02P 21/24 |

OTHER PUBLICATIONS

European Search Report; Application No. EP 20 17 0391; dated Sep. 3, 2020; 2 Pages.

* cited by examiner

ANGULAR POSITION ERROR ESTIMATION AT STANDSTILL FOR HIGH-FREQUENCY VOLTAGE INJECTION

TECHNICAL FIELD

Various example embodiments relate to control of industrial processes.

BACKGROUND

In synchronous electric motors, the rotation of the motor shaft (i.e., of the rotor) is synchronized with the frequency of the supply current at steady state so that the rotation period is exactly equal to an integral number of alternating current (AC) cycles. One common way for controlling synchronous electric motors is the so-called vector control where the torque of the motor is controlled by controlling a stator current vector. To enable said vector control, the angular position of the rotor needs to be estimated (e.g., using voltage injection). This estimation is mainly dependent on the saliency of the motor. One of the main challenges for any saliency-based sensorless method is overcoming the error introduced by differential cross coupling between the d- and q-axes in the rotating reference frame.

U.S. Pat. No. 10,224,851 B2 discloses a system and a method for sensorless control of electric machines using magnetic alignment signatures. WO 00/25418 A1 discloses a system and a method for speed-sensorless control of an induction machine. SILVERIO BOLOGNANI ET AL: "Sensorless quasi-standstill and very low-speed position detection in non-salient PMSMs based on current injection and back-EMF observer", SENSORLESS CONTROL FOR ELECTRICAL DRIVES (SLED), 2012 IEEE SYMPOSIUM ON, IEEE, 21 Sep. 2012 (2012 Sep. 21), pages 1-7, P032322100, DOI: 10.1109/SLED.2012.6422813, ISBN: 978-1-4673-2966-8 discloses methods for position detection of a permanent magnet synchronous motor based on the detection of torque production by signal injection. Specifically, two different application cases are disclosed: an initial high-accuracy position detection at quasi-standstill and a position and speed tracking for closed-loop sensorless speed control.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide an apparatus, a method, and computer readable media for performing angular position error estimation for a synchronous motor.

BRIEF DESCRIPTION OF DRAWINGS

In the following, example embodiments will be described in greater detail with reference to the attached drawings, in which.

DETAILED DESCRIPTION OF SOME EMBODIMENTS

Figure 1:
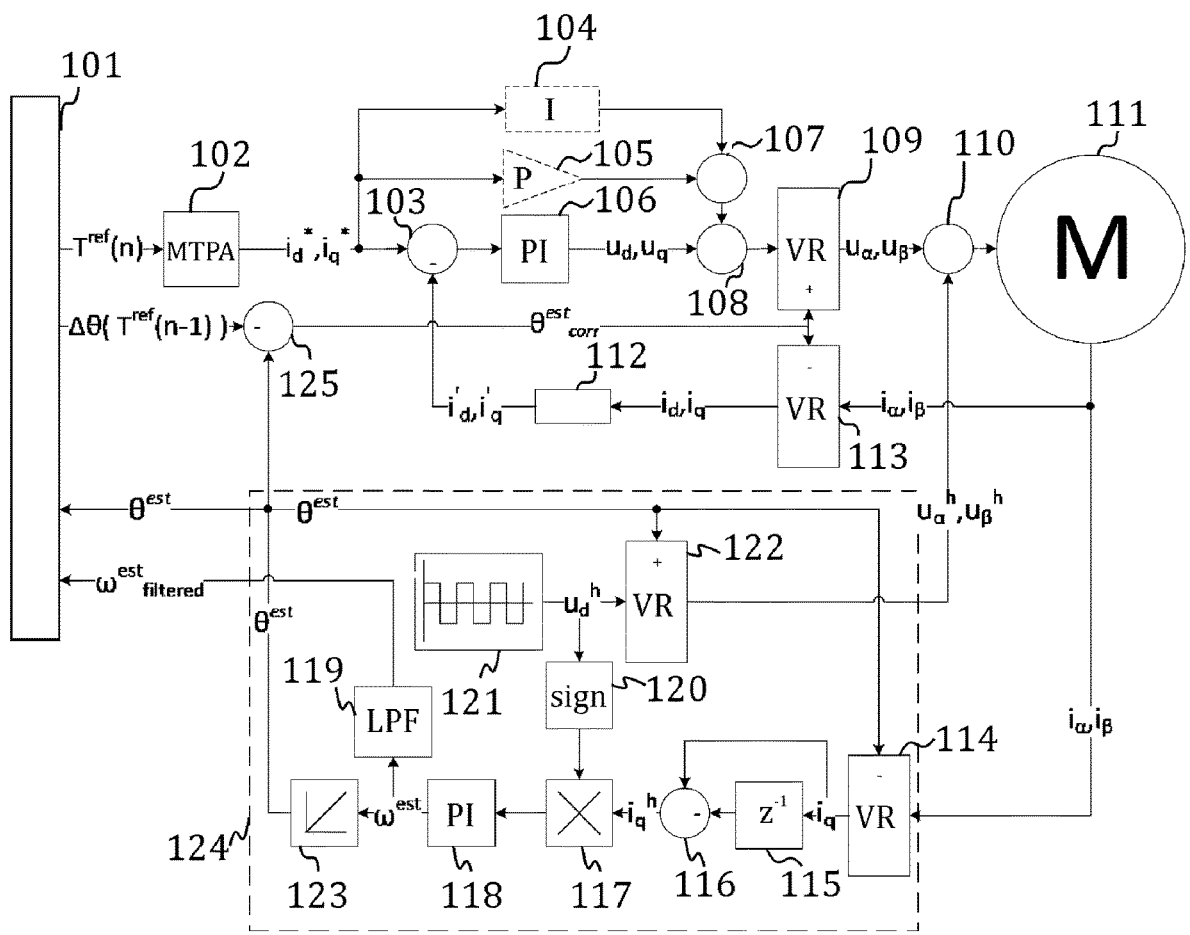
FIG. 1 illustrates an exemplary industrial system according to one embodiment.

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

A synchronous motor is an electric motor where the rotation of the motor shaft (i.e., of the rotor) is synchronized with the frequency of the supply current at steady state so that the rotation period is equal to an integral number of alternating current (AC) cycles. Synchronous motors may contain either multiphase AC electromagnets or permanent magnets on the stator of the motor that create a magnetic field which rotates in phase with the oscillations of the line current. The rotor with permanent magnets or electromagnets turns in step with the stator field at the same rate and as a result, provides the second synchronized rotating magnet field of any AC motor. Some alternative synchronous motors, namely synchronous reluctance motors, generate torque through magnetic reluctance. In synchronous reluctance motors, the stator consists of multiple projecting (salient) electromagnet poles while the rotor consists of soft magnetic material having multiple projections acting as salient magnetic poles through magnetic reluctance. Synchronous reluctance motors have an equal number of stator and rotor poles.

One common way for controlling synchronous motors is the so-called vector control where the torque of the machine is controlled by controlling a stator current and/or voltage vector. The stator current/voltage vector is a vector comprising two orthogonal stator current/voltage components derived from stator currents/voltages of a three-phase AC electric machine. One of said components defines the magnetic flux of the motor, the other the torque of the motor. These stator current/voltage components may be written either in a stationary reference frame as $\alpha$- and $\beta$-axis stator currents/voltages or in a moving reference frame (moving in sync with the rotor) as d- and q-axis stator currents/voltages, respectively. The actual control in the vector control is typically performed for the d- and q-axis stator currents or voltages while the $\alpha$- and $\beta$-axis stator currents or voltages are used for actually driving the synchronous motor. The d- and q-axis currents/voltages may be converted to the $\alpha$- and $\beta$-axis currents/voltages using inverse Park transform while an opposite transformation is possible using Park transform.

For performing the Park and inverse Park transforms, the angular position of the rotor (i.e., the rotation angle of the rotor) needs to be known. The voltage injection methods may be used for the estimation of the angular position of the rotor. This estimation is dependent on the saliency of the motor (i.e., the variation of the inductance at the motor terminal according to the rotor position). One of the main challenges in any saliency-based sensorless method for angular position estimation is overcoming the error introduced by the differential cross coupling between the d- and q-axes (i.e., direct and quadrature axes) in the rotating reference frame. The d- and q-axes are the single-phase representations of the flux contributed by the three separate sinusoidal phase quantities (denoted conventionally with letters "U", "V" and "W") at the same angular velocity. The d-axis is the magnetic axis of the rotor while the q-axis is the axis along which torque is produced (i.e., the torque may be directly controlled by adjusting the q-axis current). By convention, the quadrature axis always will lead the direct axis electrically by 90° or, in a more general case where the number of magnetic pole pair may be larger than one, by 180°/(2p), where p is the number of magnetic polar pairs. The cross-coupling between d- and q-axes is typically described in the voltage equation as an inductance, as will discussed below.

In the following, the problem of error in angular position estimation in synchronous motors controlled using vector control with voltage injection is discussed in a general sense and studied analytically before discussing solutions to said problem according to embodiments in detail.

The following voltage equations describe the voltage balance in a non-hysteretic magnetic system where the only losses are related to metal losses (e.g., copper losses):

$$u_d = i_d R_s + \frac{d\lambda_d}{dt} - \omega_{me}\lambda_q,$$

$$u_q = i_q R_s + \frac{d\lambda_q}{dt} - \omega_{me}\lambda_q,$$

where $u_d$ and $u_q$ are stator voltages associated with the d- and q-axes, $i_d$ and $i_q$ are stator currents associated with the d- and q-axes, $R_s$ is a resistance associated with resistive losses in the metal, $\lambda_d$ and $\lambda_q$ are flux linkage components for d- and q-axes and $\omega_{me}$ is the angular speed (or equally angular frequency) of the rotor. The flux linkages may be written as $\lambda_d = \lambda_m + L_d i_d$ and $\lambda_q = L_q i_q$, where $\lambda_m$ is a magnet flux.

In cases where the magnetic relation between the d-axis currents and the d-axis magnetic fluxes is also affected by the q-axis current (and vice versa, when the q-axis quantities are affected by the d-axis current), an inductive cross-coupling term $L_{dq}$ is introduced into the voltage equations. In such cases, the voltage equation may be written (in matrix form) as:

$$\begin{bmatrix} u_d \\ u_q \end{bmatrix} = \begin{bmatrix} i_d \\ i_q \end{bmatrix} R_s + \begin{bmatrix} L_d & L_{dq} \\ L_{dq} & L_q \end{bmatrix} \frac{d}{dt}\begin{bmatrix} i_d \\ i_q \end{bmatrix} - \omega_{me}\begin{bmatrix} 0 & -1 \\ 1 & 0 \end{bmatrix}\begin{bmatrix} \lambda_d \\ \lambda_q \end{bmatrix}$$

For a high-frequency injection in the d-axis, the following voltage waveform may be used:

$$\begin{bmatrix} u_d \\ u_q \end{bmatrix} = \begin{bmatrix} u_d^h \cos(\omega_h t) \\ 0 \end{bmatrix},$$

where $u_d^h$ is an amplitude of the d-axis stator voltage signal, $\omega_h$ is the (high) angular frequency of the d-axis voltage signal and t is time. While in the above equation high-frequency voltage injection is carried out for the d-axis, it should be noted high-frequency voltage injection may be equally carried out for the q-axis by defining $$\begin{bmatrix} u_d \\ u_q \end{bmatrix} = \begin{bmatrix} 0 \\ u_q^h \cos(\omega_h t) \end{bmatrix}.$$

By applying high-frequency voltage injection in the previous equation to the voltage equation including the inductive cross-coupling term and by further assuming that the high-frequency voltage injection is applied at relatively high frequencies (meaning that $R_s$ is close to zero and can be thus neglected) and at very low speeds (meaning that $\omega_{me}$ is close to zero and can be thus neglected), the voltage equation may be written as $$\begin{bmatrix} u_d^h \cos(\omega_h t) \\ 0 \end{bmatrix} = \begin{bmatrix} L_d & L_{dq} \\ L_{dq} & L_q \end{bmatrix} \frac{d}{dt}\begin{bmatrix} i_d \\ i_q \end{bmatrix}.$$

Extracting the currents as function of the voltages, it follows that:

$$\begin{bmatrix} i_d^h \\ i_q^h \end{bmatrix} = \int_0^t \begin{bmatrix} L_d & L_{dq} \\ L_{dq} & L_q \end{bmatrix}^{-1} \begin{bmatrix} u_d^h \cos(\omega_h t) \\ 0 \end{bmatrix} dt.$$

As the supplied injected voltage is given in the estimated dq reference frame, an estimated angular position $\theta_{observer}$, which is not necessarily equal to the actual angular position, is considered. In presence of an angular position error $\Delta\theta$, the relation between the estimated angular position $\theta_{observer}$ and the actual angular position $\theta_m$ is $\theta_{observer} = \theta_{me} + \Delta\theta$. The difference between the estimated and the actual dq reference frames may be written in the form of a rotating matrix:

$$T(\Delta\theta) = \begin{bmatrix} \cos(\Delta\theta) & -\sin(\Delta\theta) \\ \sin(\Delta\theta) & \cos(\Delta\theta) \end{bmatrix}.$$

Therefore, the high-frequency currents in the actual dq reference frame may be written as:

$$\begin{bmatrix} i_d^h \\ i_q^h \end{bmatrix} = \int_0^t T(\Delta\theta) \begin{bmatrix} L_d & L_{dq} \\ L_{dq} & L_q \end{bmatrix}^{-1} T^{-1}(\Delta\theta) \begin{bmatrix} u_d^h \cos(\omega_h t) \\ 0 \end{bmatrix} dt =$$

$$\frac{u_d^h \sin(\omega_h t)}{2\omega_h(L_d L_q - L_{dq}^2)} \begin{bmatrix} (L_d + L_q) + 2L_{dq}\sin(2\Delta\theta) - (L_d - L_q)\cos(2\Delta\theta) \\ -2L_{dq}\cos(2\Delta\theta) - (L_d - L_q)\sin(2\Delta\theta) \end{bmatrix}.$$

Furthermore, the term $\hat{i}_q^h$ may be demodulated (to remove the term $\sin(\omega_h t)$) and used for extracting the rotor position:

$$\hat{i}_q^h = \frac{u_d^h}{2\omega_h(L_d L_q - L_{dq}^2)}(-2L_{dq}\cos(2\Delta\theta) - (L_d - L_q)\sin(2\Delta\theta)).$$

By setting $\hat{i}_q^h = 0$, the angular position error $\Delta\theta$ may be derived. Said angular position error may be written as $$\Delta\theta = \frac{1}{2}\arctan\left(\frac{L_{dq}}{L_q - L_d}\right).$$

In the presence of a non-zero $L_{dq}$, by setting $\Delta\theta=0$, the magnitude of the error signal ε may be written as (based on the above equation for $\hat{i}_q^h$):

$$\varepsilon = -\frac{u_d^h}{\omega_h}\frac{L_{dq}}{L_d L_q - L_{dq}^2}.$$

While in the special case where $L_{dq}$ is equal to zero and thus the angular position error is also equal to zero, the rotor position can be extracted by controlling $\hat{i}_q^h$ without errors, in most practical cases, this is not true and a compensation for the angular position error needs to be arranged so as to accurately estimate the angular position of the rotor. However, this is not a simple task as measuring the inductances $L_{dq}$, $L_d$ and $L_q$ directly is not feasible. The embodiments provide a solution enabling accurate evaluation of the position error without a position sensor and without (substantially) rotating the synchronous motor.

FIG. 1 illustrates a system for controlling a synchronous motor. Specifically, FIG. 1 illustrates elements 101 to 110, 112, 113 for generating stator voltage signals for driving the synchronous motor 111 and a position estimation unit 124 for estimating the angular position of the rotor of the synchronous motor 111. The angular position of the rotor is needed for driving the synchronous motor 111 in an accurate manner using vector control, as discussed above and thus the outputs of the position estimation unit 124 are used by elements 101, 109, 113 which drive the synchronous motor 111. The elements 101 to 110, 112 to 124 may form or be comprised in a drive (equally called a motor drive or an electric drive). The synchronous motor 111 may be running an industrial or non-industrial process, for example, a system for transporting material, such as a pump, a fan, a compressor, a blower, a conveyor belt, a crane and/or an elevator and/or a system for processing materials, such as a paper machine, a mill, a stirrer and/or a centrifuge. The illustrated system is based on (sensorless) vector control with high-frequency voltage injection. Any of elements 101 to 110, 112 to 124 may be logical elements implemented as hardware or software or a combination thereof.

In the following, the operation of the system of FIG. 1 is discussed starting from an initial state where the system has not yet been fully deployed and the angular position error estimation has not yet been carried out. The operation of the system following the deployment procedure (i.e., angular position error estimation procedure) is discussed thereafter.

Initially, the $\Delta\theta$ estimator state machine may maintain, in a database, only information on one or more pre-defined pulsating torque signals, each of which corresponds to a particular torque operating point (i.e., a particular torque level). The goal of the angular position error estimation procedure to be discussed below is to gather information on the error in the estimated angular position of the rotor of the synchronous motor 111 (as estimated by the illustrated system using high-frequency voltage injection) at one or more torque operating points by operating the synchronous motor 111 according to each of the one or more pre-defined pulsating torque signals in sequence. Preferably, the one or more torque operating points comprises a plurality of torque operating points and cover the whole operational range of the synchronous motor 111. Said error in the estimated angular position is caused by the cross-coupling inductance $L_{dq}$ associated with the d- and q-axis stator currents, as discussed above. Further, the plurality of pre-defined pulsating torque signals corresponding to the plurality of torque operating points are, preferably, applied sequentially in order of increasing torque operating point (i.e., starting from the lowest torque operating point and ending with the highest torque operating point). In other embodiments, another order may be employed (e.g., order of a decreasing torque operating point or a random order). The spacing between consecutive torque operating points may be the same for all consecutive torque operating points.

Figure 2:
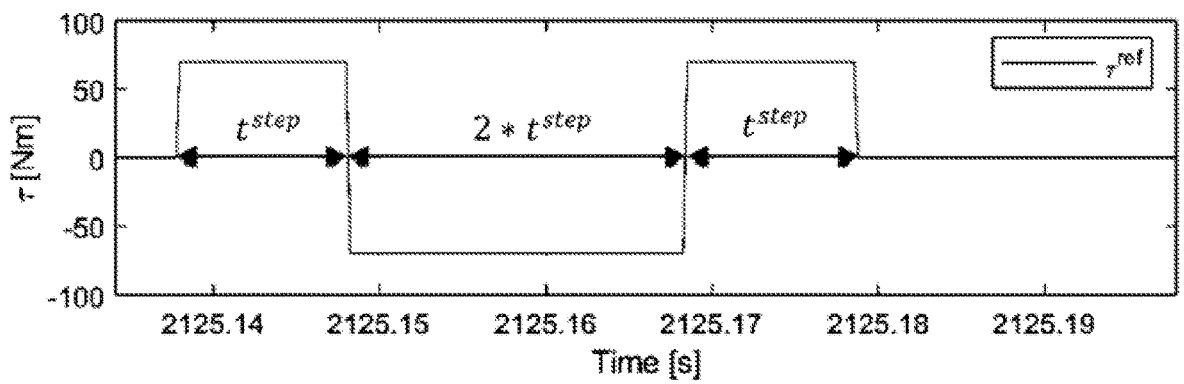
FIGS. 2 and 3 illustrate exemplary measurement results.

Each of the one or more pre-defined pulsating torque signals defined in the database of the $\Delta\theta$ estimator state machine 101 may comprise one or more positive pulses (e.g., positive square pulses) and one or more negative pulses (e.g., negative square pulses). Each of said one or more positive pulses have preferably the same peak amplitude. A peak amplitude of each pre-defined pulsating torque signal corresponds to a torque operating point of the synchronous motor. Further, each pre-defined pulsating torque signal has a zero mean so that the total movement of the rotor of the synchronous motor 111 when the synchronous motor 111 is driven according to the pre-defined pulsating torque signal is minimized. In other words, the initial angular position of the rotor before the application of the pre-defined pulsating torque signal should be approximately the same as the final angular position of the rotor following the application of the pre-defined pulsating torque signal. Preferably, said one or more positive pulses and said one or more negative pulses should also be arranged in such a manner that the total movement of the rotor caused by the application of the pre-defined pulsating torque signal is minimized. In some embodiments, the pre-defined pulsating torque signal may, for example, consist of a first positive (square) pulse having a first duration $t_{step}$, a negative (square) pulse having a second duration $2t_{step}$ (i.e., being twice the first duration) and a second positive (square) pulse having the first duration $t_{step}$. These three pulses may be in the described order (or in some other order) and/or they may or may not directly follow each other (i.e., there is zero or non-zero time separation between consecutive pulses). All three pulses may have the same peak amplitude. One such example of a pre-defined pulsating torque signal is shown in FIG. 2 (to be discussed in detail below). To give another example, the pre-defined pulsating torque signal may, in other embodiments, consist of a first negative (square) pulse, a negative (square) pulse, a second positive (square) pulse and a second negative (square) pulse in this order, where each pulse has the same duration. Any of the consecutive pulses may or may not directly follow each other also in this embodiment.

In order to estimate the error in the estimated angular position of the rotor for a given torque operating point, the synchronous motor 111 is operated according to the pre-defined pulsating torque signal corresponding to said torque operating point using a sensorless vector control method employing high-frequency voltage injection (i.e., using elements 101 to 110, 112 to 124).

First, the pre-defined pulsating torque signal $T^{ref}(n)$ produced by the $\Delta\theta$ estimator state machine 101 is processed in a maximum torque per ampere (MTPA) element 102 implementing a MTPA control method to form. The MTPA control method produces the desired torque while minimizing current magnitude. The MTPA element 102 generates d- and q-axis stator current signals $i^*_d$ and $i^*_q$ based on the pre-defined pulsating torque pulse signal $T^{ref}(n)$ using said MTPA control method. In other embodiments, other means for converting the pre-defined pulsating torque signal to the d- and q-axis stator current signals may be employed.

Then, a first difference signal is calculated, in element 103, as a difference between a generated d-axis stator current signal $i^*_d$ and a measured d-axis stator current signal $i'_d$ of the synchronous motor 111. Correspondingly, a second difference signal is calculated as a difference between a generated q-axis stator current signal $i^*_q$ and a measured q-axis stator current signal $i'_q$ of the synchronous motor 111 also in element 103. The first and second difference signals quantify the error between desired stator currents and the actual measured stator currents. How the measured d- and q-axis stator current signals $i'_d$ and $i'_q$ are actually measured, in elements 112, 113, is discussed later.

A d-axis stator voltage signal $u_d$ is calculated, by a first proportional-integral (PI) controller 106, based on the first difference signal. Correspondingly, a q-axis stator voltage signal $u_q$ is calculated, also by the PI controller 106, based on the second difference signal.

Optionally in order to increase the dynamics of the control, the d- and q-axis stator voltage signals $u_d$ and $u_q$ may be combined (i.e., summed together), in a combining (i.e., summing) element 108, respectively, with first optional d- and q-axis voltage stator signal components, second optional d- and q-axis stator voltage signal components or both. Specifically, the first optional d- and q-axis voltage stator signal components may be calculated by an integral (I) controller 104 fed by the generated d- and q-axis stator current signals $i^*_d$ and $i^*_q$ and the second optional d- and q-axis voltage stator signal components may be calculated by a proportional (P) controller 105 fed by the generated d- and q-axis stator current signals $i^*_d$ and $i^*_q$. If both the first and second optional d- and q-axis voltage stator signal components are calculated, they may be combined in a combining (i.e., summing) element 107 before the resulting signal is combined in the combining element 108 with the d- and q-axis stator voltage signals $u_d$ and $u_q$. All of the operations discussed in this paragraph are carried out separately for d-axis signals and for q-axis signals (e.g., d-axis signals are combined only with other d-axis signals and q-axis signals are combined only with other q-axis signals).

To switch from the rotating reference frame defined by the d- and q-axes to a stationary reference frame of the stator of the synchronous motor 111, the d- and a q-axis stator voltage signals $u_d$ and $u_q$ are transformed, in vector rotation (VR) element 109, to α- and β-axis stator voltage signals $u_\alpha$ and $u_\beta$ using inverse Park transform. The inverse Park transform requires knowledge of the current angular position (i.e., rotation angle) of the rotor. The current angular position may be estimated continuously during the running of the angular position error estimation procedure, as will be described in detail below.

The α- and β-axis stator voltage signals $u_\alpha$ and $u_\beta$ are injected in a combining element 110 together with high-frequency α- and β-axis stator voltage signals $u_\alpha^h$ and $u_\beta^h$ (according to a high-frequency voltage injection principles), and the respective combinations of these signals are fed to the stator of the synchronous motor 111.

Said high-frequency α- and β-axis stator voltage signals $u_\alpha^h$ and $u_\beta^h$ are generated as follows. Initially, a signal generation element 121 in the position estimation unit 124 generates a high-frequency square-wave d-axis stator voltage signal having a frequency larger than a frequency of the pre-defined pulsating torque signal. Preferably, the frequency of the high-frequency square-wave d-axis stator voltage signal should be much larger (e.g., one or more orders of magnitude larger or two or more orders of magnitude larger) than the frequency of the predefined pulsating torque signal so that the high-frequency component may be easily isolated, by high-pass filtering, from the main stator voltage/current signals to which it has been inserted. For example, the frequency of the high-frequency square-wave d-axis stator voltage signal may be at least larger than the frequency of the pre-defined pulsating torque signal multiplied by ten or one hundred. Then, the high-frequency square-wave d-axis stator voltage signal is converted to said high-frequency α- and β-axis stator voltage signals using inverse Park transform in vector rotation element 122. Similar to as discussed in relation to vector rotation element 109, it is assumed here, at this point, that the angular position of the rotor required for performing the inverse Park transform is simply known. How it is known (i.e., how it is evaluated) is discussed in detail below. As mentioned also above, a high-frequency square-wave q-axis stator voltage signal may be equally used for the high-frequency voltage injection, instead of the high-frequency square-wave d-axis stator voltage.

The synchronous motor 111 produces α- and β-axis output stator current signals $i_\alpha$ and $i_\beta$ which may be measured to produce an output. These current signals are used for two different purposes. Firstly, the α- and β-axis output stator current signals $i_\alpha$ and $i_\beta$ are converted, in a vector rotation element 113 using Park transform, to d- and q-axis output stator current signals $i_d$ and $i_q$ which are subtracted, after taking an average in element 112, from the generated d- and q-axis output stator current signals $i^*_d$ and $i^*_q$, respectively. The average which may be calculated for each of the d- and q-axis output stator current signals $i_d$ and $i_q$ in element 112 may be specifically two-sample average. The purpose of calculating the average is to eliminate the high-frequency components (i.e., signal components resulting from the voltage injection) from the d- and q-axis stator current signals $i_d$ and $i_q$. Similar to as discussed above in relation to elements 109, 122, Park transform in element 113 may be calculated based on a previously estimated (or pre-defined) value of the angular position of the rotor maintained in the database of the Δθ estimator state machine 101.

Secondly, the α- and β-axis output stator current signals $i_\alpha$ and $i_\beta$ are used for estimating the angular position of the rotor and the angular speed of the rotor in the position estimation unit 124. In this case, the α- and β-axis output stator current signals $i_\alpha$ and $i_\beta$ are first converted, in a vector rotation element 114, using Park transform to a q-axis output stator current signal $i_q$. Also in element 114, Park transform may be calculated based on a previously estimated or pre-defined value of the angular position of the rotor, as will be described in detail below. Then, the q-axis output stator current signal $i_q$ is high-pass filtered in elements 115, 116 so as to isolate a high-frequency q-axis output stator current signal component $i_q^h$. Specifically, a unit delay is applied to the q-axis output stator current signal, in the unit delay element 115, and the resulting delayed current signal is subtracted, in the subtraction element 116, from the q-axis output stator current signal $i_q$ without such a delay. The high-frequency q-axis output stator current signal corresponds, here, to a response of the synchronous motor 111 to the high-frequency square-wave d-axis stator voltage signal fed (or injected) to the synchronous motor 111, i.e., it is the signal component resulting from the voltage injection.

A product of the high-frequency q-axis output stator voltage component and a signal formed by applying a signum function, in element 120, to the high-frequency square-wave d-axis stator voltage signal is calculated in multiplication element 117.

Based on said product, a first signal corresponding to the estimated angular speed $\omega^{est}$ is calculated using a second PI controller 118. As this signal may be quite noisy, it is low-pass filtered, at least in some embodiments, in low-pass filter (LPF) 119, to form a second signal corresponding to the estimated angular speed $\omega_{filtered}^{est}$. Specifically, the values of this second signal $\omega_{filtered}^{est}$ are used in the angular position error estimation. The cut-off frequency of the LPF 119 may be defined based on $\Delta t$ and the response time of the phase-locked loop (PLL) of the position estimation unit 124, where $\Delta t$ denotes a (pre-defined) time separation of first measurements performed by the system at a first time instance while the pre-defined pulsating torque signal is being applied and subsequent second measurements performed by the system at a second time instance when the pre-defined pulsating torque signal is no longer applied. Preferably, $\Delta t$ should be as small as possible. A plurality of values of the (final) estimated angular speed may be stored to a lookup table maintained in a database of the $\Delta\theta$ estimator state machine 101. Specifically, said plurality of values of the (final) estimated angular speed may comprise one or more of:
- a first value of the estimated angular speed $\omega_1^{est}$ measured at a first time instance corresponding to a non-zero torque in the pre-defined pulsating torque signal,
- a second value of the estimated angular speed $\omega_2^{est}$ measured at a second time instance corresponding to a zero torque in the pre-defined pulsating torque signal and following the first time instance (specifically, occurring a pre-defined time $\Delta t$ after it) and
- a zeroth value of the estimated angular speed $\omega_0^{est}$ measured at a zeroth time instance corresponding to a zero torque and preceding the pre-defined pulsating torque signal and the first time instance (i.e., measured before the application of the pre-defined pulsating torque signal).

The first time instance may, specifically, correspond (substantially) to a time instance denoting an end point of the pre-defined pulsating torque signal. In other words, the first time instance may be the last point with non-zero torque value in the pre-defined pulsating torque signal. As the pre-defined pulsating torque signal is defined so that the total movement of the rotor is minimized, at the first time instance the angular position of the rotor should be roughly the same as before the application of the pre-defined pulsating torque signal (see the third subfigure of FIG. 3 from the top). The zeroth time instance corresponds to a time instance before the pre-defined pulsating signal is applied (and thus also before the first and second time instances). Here and in the following, the quantities $\omega_0^{est}$, $\omega_1^{est}$ and $\omega_2^{est}$ may correspond specifically to low-pass-filtered quantities (as discussed in relation element 119). Alternatively, the quantities $\omega_0^{est}$, $\omega_1^{est}$ and $\omega_2^{est}$ may correspond to non-low-pass-filtered quantities (e.g., if the system according to an embodiment does not include the low-pass-filter 119).

The first signal corresponding to the estimated angular speed $\omega^{est}$ further integrated (over time) in integration element 123 to generate a signal corresponding to the estimated angular position of the rotor $\theta^{est}$. The most current value of this signal defines, during the operation of the system, the current estimated angular position of the rotor used by the vector rotation elements 109, 113, 114, 122. Values of the estimated angular position of the rotor may be stored to a lookup table maintained in a database of the $\Delta\theta$ estimator state machine 101. Specifically, said values of the estimated angular position of the rotor may comprise one or more of

- a second value of the estimated angular position $\theta_2^{est}$ measured at the second time instance (i.e., after the application of the pre-defined pulsating torque signal),
- a zeroth value of the estimated angular position $\theta_0^{est}$ measured at the zeroth time instance and
- a first value of the estimated angular position $\theta_1^{est}$ measured at the first time instance.

The zeroth, first and second time instances are defined as discussed above, that is, the measurements of the estimated angular position and the estimated angular speed may coincide with each other.

In addition to the aforementioned measurements of the estimated angular position and the estimated angular speed, coinciding values of the desired torque (i.e., a value of the pre-defined pulsating torque signal) may also be measured and stored to the lookup table. In other words, one or more of the following values may be measured and stored to the lookup table:
- a zeroth value of the desired torque $\tau_0^{ref}$ measured at the zeroth time instance (ideally, a zero value),
- a first value of the desired torque $\tau_1^{ref}$ measured at the first time instance (corresponding to the torque operating point) and
- a second value of the desired torque $\tau_2^{ref}$ measured at the second time instance (ideally, a zero value).

In some embodiments, the aforementioned torque values (or at least some of them) may be pre-stored to the lookup table.

Figure 3:
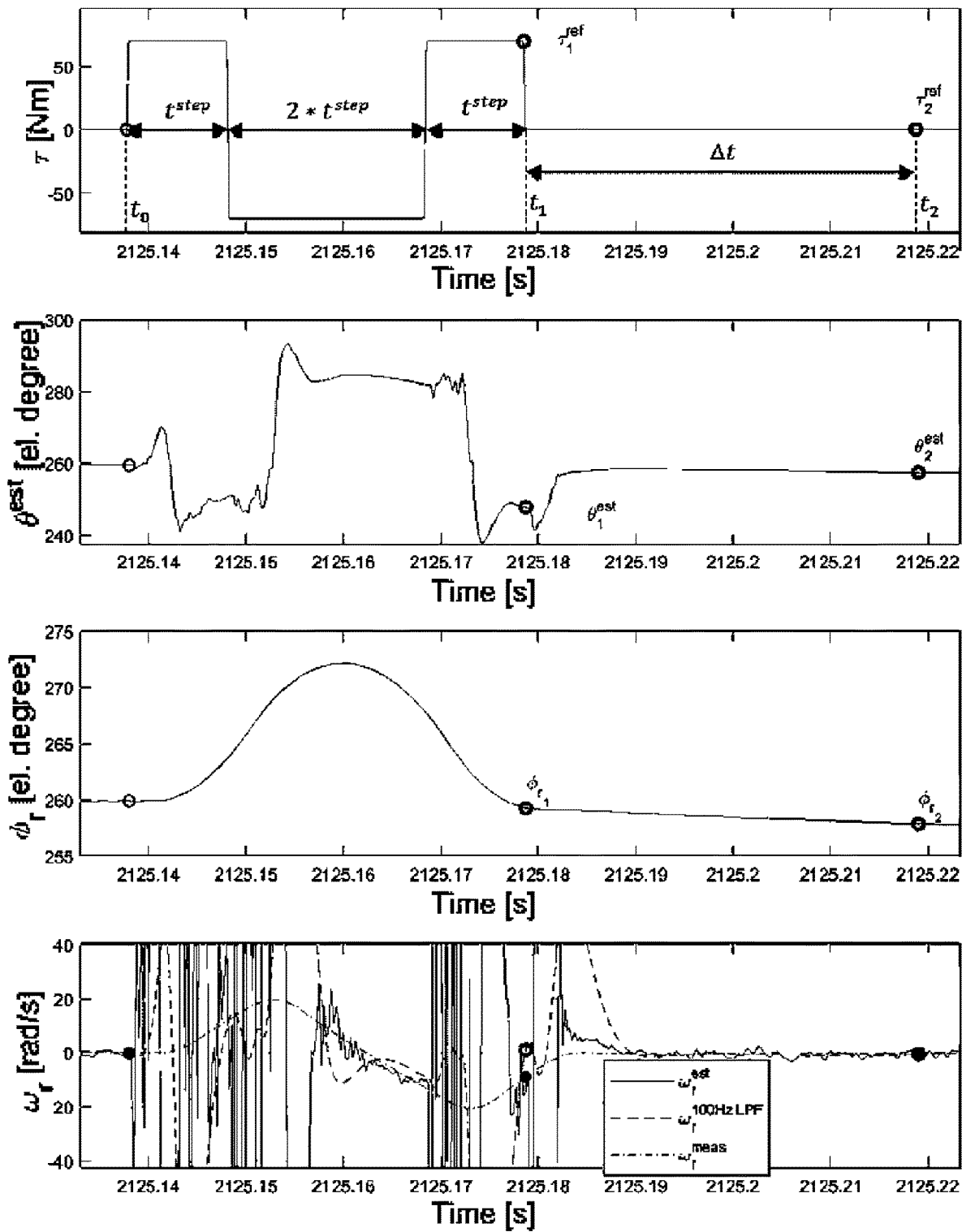

One example of measurements carried out for calculating the error in the estimated angular position of the rotor is illustrated in FIG. 3 (to be discussed in detail later).

Based on the values of the estimated angular position and the estimated angular speed, the $\Delta\theta$ estimator state machine 101 calculates an estimate for the error in the estimated angular position (at the first time instance associated with non-zero torque) for the torque operating point defined the pre-defined pulsating torque signal. Specifically, the calculated error corresponds the error in the first value of the estimated angular position. Subsequently, the calculated error is stored to the lookup table in the database of the $\Delta\theta$ estimator state machine 101. Specifically, this calculation is performed as follows. As described above, during each $\Delta\theta$ estimation procedure for a single torque level (i.e., for a single torque operating point), measurements may be taken of the desired torque $\tau_{ref}$, the estimated angular position $\theta_{est}$ and low-pass-filtered estimated angular speed $\omega_r^{est}$. At minimum, the following three measured values are needed for the position error estimation:
- a first value of the estimated angular position $\theta_1^{est}$ at the first time instance corresponding to a non-zero torque in the pre-defined pulsating torque signal corresponding substantially to an end point of the pre-defined pulsating torque signal,
- a second value of the estimated angular position $\theta_2^{est}$ at the second time instance occurring a pre-defined time $\Delta t$ after the first time instance (i.e., following both the first time instance and an end of the pre-defined pulsating torque signal) and
- a second value of an estimated angular speed $\omega_{r_2}^{est}$ at the second time instance.

The measured estimated angular position is a linear combination of the actual angular position $\phi r$ and $\Delta\theta$ in the estimation. However, it may be assumed, without considerably sacrificing accuracy, that at zero torque ($\tau_{ref}=0$), the error in estimated angular position is negligible $\Delta\theta(0)\approx0$. Thus, the three measurements for the estimated angular position relate to the actual angular position according to the following equations:

$$\theta_0^{est} \approx \phi_{r_0}$$

$$\theta_1^{est}(\tau^{ref}) \approx \phi_{r_1} + \Delta\theta(\tau^{ref})$$

$$\theta_2^{est} \approx \phi_{r_2}.$$

According to the middle equation shown above, the actual angular position $\phi_{r_1}$ must be known for calculating $\Delta\theta(\tau_{ref})$. This actual angular position may be calculated using (low-pass-filtered) estimated angular speed at time $t_2$ and integrating back by time $\Delta t$. Here, $\Delta t$ is the duration between the first and second time instances. Assuming that the term $\Delta t$ is sufficiently small, the following equation applies for the actual angular position $\phi_{r_1}$ at the first time instance:

$$\phi_{r_1} \approx \phi_{r_1}^{est} = \theta_2^{est} - \omega_{r_2}^{est}\Delta t,$$

where the angular speed of the rotor is assumed to be constant. Thus, the error in the estimated angular position may be written as $$\Delta\theta = \theta_1^{est} - \theta_2^{est} + \omega_{r_2}^{est}\Delta t.$$

Notably, the above calculation of the error in the estimated angular position only employs measurements carried out at first and second time instances. The reliability of this procedure may be improved by taking advantage of measurements carried out at the zeroth time instance (i.e., before the pre-defined pulsating torque signal is applied). According to an embodiment, the initial estimated angular position $\theta_0^{est}$ (at the zeroth time instance) and the angular position $\phi_{r_1}^{est}$ at the first time instance may be compared to each other to evaluate whether the system is operating in a desired manner. Ideally, if the pre-defined pulsating torque signal is applied correctly, the initial and final estimated angular positions should be equal.

During the angular position error estimation, the error in the estimated angular position is obviously not yet known. However, in order to accurately perform the Park and inverse Park transforms in elements 109, 113, 114, 122 and thus to accurately perform the measurements and calculate said error, the error in the estimated angular position should preferably be evaluated in some way. This correction of the error in the estimated angular position during the angular position error estimation may be arranged, for example, as follows. Here, it may be assumed that the one or more pre-defined pulsating torque signals are applied in increasing or decreasing order of torque operation point. For nth torque operating point $\tau(n)$ of the one or more torque operating points, a corrected estimated angular position is calculated, in a subtraction element 125, according to $$\theta_{corr}^{est}(\tau(n)) = \theta^{est} - \Delta\theta(\tau(n-1))x,$$

where $\theta^{est}$ is a value of a current estimated angular position as evaluated by the vector control method (specifically, by the position estimation unit 124), $\tau$ is a value of torque associated with the torque operating point, $\Delta\theta(\tau(n-1))$ is a value of the error in the estimated angular position calculated for a previous torque operating point in sequence (i.e., the previously calculated value of the error in the estimated angular position corresponding most closely to the current torque operating point) and maintained in the lookup table and x is defined as $$x = \begin{cases} 1 & \text{for } \tau > 0 \\ 0 & \text{for } \tau = 0 \\ -1 & \text{for } \tau < 0 \end{cases}.$$

For the first torque operating point in sequence $\tau(1)$, the corrected estimated angular position may be calculated assuming a pre-defined value (e.g., zero) for the term $\Delta\theta(\tau(0))$. Preferably, the first torque operating point in sequence $\tau(1)$ corresponds to the lowest torque operation point so that $\Delta\theta(\tau(0)) \approx 0$ is a fair assumption. The corrected estimated angular position is subsequentially used in the sensorless vector control method (specifically, in the inverse Park transforms therein).

In some more general embodiments where pre-defined pulsating torque signals corresponding to different torque operating points may be applied in any order, the following equation may be used for calculating a corrected estimated angular position:

$$\theta_{corr}^{est}(\tau(n)) = \theta^{est} - \Delta\theta(\tau_{closest})x.$$

Here, the term $\Delta\theta(\tau(n-1))$ has been replaced with a term $\Delta\theta(\tau_{closest})$ which is a value of the error in the estimated angular position calculated for a previous torque operating point $\tau_{closest}$ which is closest to the current torque operating point and is maintained in the lookup table. Thus, the term $\tau_{closest}$ corresponds to an index smaller or equal to n−1.

Even by using the above equations for correcting value of the estimated angular position during the deployment, the estimated angular position may not be completely corrected. To further improve the correction, the previously calculated values of the error in the estimated angular position may be linearly extrapolated or interpolated to calculate an estimated angular position for $\tau(n)$ (i.e., for the current torque operating point). For example, if the one or more pre-defined pulsating torque signals are applied in the order of increasing or decreasing torque operation point, extrapolation may be used. Interpolation may be used in cases where the value of the error in the estimated angular position to be calculated corresponds to a torque operating point which lies between two torque operating points for which said error has already been evaluated. A corrected estimated angular position is calculated, in a subtraction element 125, for nth torque operating point $\tau(n)$ of the one or more torque operating points, according to $$\theta_{corr}^{est}(\tau(n)) = \theta^{est} - \Delta\theta(\tau(n))x.$$

This option may be especially beneficial for synchronous motors having linear $\Delta\theta$, e.g., synchronous reluctance motors (SynRM). However, for synchronous motors with non-linear $\Delta\theta$ such as interior permanent magnet (IPM) motors and permanent magnet assisted synchronous reluctance motors (PMaSynRM), it may lead to significant error between $\theta_{corr}^{est}$ and $\theta_r$. Another option for further improving the correction is reducing the torque step size (i.e., the separation between nearest torque operating points or levels). Reducing the torque step size has many benefits such as higher resolution of torque-to-$\Delta\theta$ lookup tables and smaller error between estimated and actual reference frames.

The processes discussed above for a single torque operating point (i.e., for a single pre-defined pulsating torque signal) may be repeated for a plurality of torque operating points (i.e., for a plurality of corresponding pre-defined pulsating torque signals). Preferably, the plurality of torque operating points should cover the whole operational range of the synchronous motor and be evaluated sequentially in increasing order. The result of these repetitions is a lookup table comprising a plurality of values for the error in the estimated angular position, where each of the plurality of values for the error correspond to a particular torque operating point. This lookup table, is, then used during the normal operation of the system for the compensation of the error in the estimated angular position. Ideally, the torque levels (i.e., torque operating points) are applied, during the repetitions, in such a pattern that the rotor comes back to its starting position.

During the normal operation (i.e., the operation following the angular position error estimation phase where the errors are calculated and stored to the lookup table), the system of FIG. 1 may operate, for the most part, as described above for the angular position error estimation phase. Obviously, any torque signal (as opposed to only a pre-defined pulsating torque signal) may be applied to the synchronous motor during the normal operation. Further, as mentioned above and described in detail below, the estimated angular position is corrected during the normal operation based on the lookup table (and on the current torque operating point).

During the normal operation (i.e., the operation following the deployment or angular position error estimation phase where the errors are calculated and stored to the lookup table), a corrected estimated angular position for use in the sensorless vector control method may be calculated, in a subtraction element 125, for the nth torque operating point $\tau(n)$ of the one or more torque operating points, according to $$\theta_{corr}^{est}(\tau(n)) = \theta^{est} - \Delta\theta(\tau(n))x,$$

wherein $\theta_{est}$ is a value of a current estimated angular position as evaluated by the vector control method, $\tau$ is a value of torque associated with the torque operating point, $\Delta\theta(\tau(n))$ is a value of the error in the estimated angular position for the current torque operating point maintained in the lookup table (or specifically the value of the error in the lookup table corresponding to a torque operating point which most closely matches the current torque operating point) and x is defined as $$x = \begin{cases} 1 & \text{for } \tau > 0 \\ 0 & \text{for } \tau = 0 \\ -1 & \text{for } \tau < 0 \end{cases}.$$

The corrected estimated angular position is subsequentially used in the sensorless vector control method (specifically, in the inverse Park transforms therein).

In practice, the synchronous motor may not be operated at a given time with torque corresponding exactly to any of the one or more pre-defined torque operating points. Thus in practice, the value of the error in the estimated angular position which is closest to the current torque operating point may be used during the normal operation (i.e., the operation following the angular position error estimation) for estimating the error in estimated angular position. In some embodiments, interpolation and/or extrapolation may be used to derive a more accurate estimate based on the values in the lookup table (i.e., to estimate values of the error for torque operating points between the one or more torque operating point for which data is stored to the lookup table).

FIG. 2 shows an example of a pre-defined pulsating torque signal $\tau^{ref}$ according to embodiments. The illustrated pre-defined pulsating torque signal consists of a first positive (square) pulse having a first duration $t_{step}$, a negative (square) pulse having a second duration $2t_{step}$ and a second positive (square) pulse having the first duration $t_{step}$. The illustrated pre-defined pulsating torque signal corresponds specifically to a torque operating point (i.e., torque operating level) of 70 Nm. The value of $t_{step}=0.01$ s is used in this example. In general, the value of $t_{step}$ may be selected based on the bandwidth of the current controllers and minimum inertia of the rotor. Ideally, it is chosen to be small enough to keep the rotor movements small though large enough for the current controllers to attain steady state.

FIG. 3 shows an example of how the measurements are performed in order to estimate the error in the estimated angular position for a single torque operating point. Specifically, the first (top) subfigure of FIG. 3 illustrates the measurement of desired torque $\tau^{ref}$, the second subfigure of FIG. 3 illustrates the measurement of the estimated angular position $\theta^{est}$, the third subfigure of FIG. 3 illustrates the measurement of the actual angular position $\phi_r$ and the fourth (bottom) subfigure of FIG. 3 illustrates the measurement of the estimated angular speed $\omega_r$ before and after low-pass filtering (LPF). It should be noted that the measured angular position $\phi_r$ is shown in FIG. 3 merely for reference. Direct measurements of the actual angular position $\phi_r$ (e.g., using a sensor) are not required for calculating the error in the estimated angular position $\Delta\theta$ according to any of the embodiments. In the illustrated measurements, the cut-off frequency of the lowpass filter (LPF) is set to 100 Hz and the term $\Delta t$ is defined as a constant according to $\Delta t=4t_{step}=0.04$ s. FIG. 3 illustrates both continuous measurements of the aforementioned quantities (not performed in embodiments) as well as instantaneous measurements carried out at the zeroth time instance (here, approx. 2125.14 s), the first time instance (here, approx. 2125.18 s) and the second time instance (here, approx. 2125.22 s), as defined above. In the fourth subfigure, hollow circles denote non-filtered values and the solid circles denote the low-pass-filtered values. In the illustrated example, the following values required for calculating the error in the estimated angular position are measured at the first and second time instances (indices 1 and 2, respectively): $\theta_1^{est}=247.8897°=4.3265$ rad, $\theta_2^{est}=257.4489°=4.4933$ rad and $\omega_{r_2}^{est}(100 \text{ Hz LPF})=-0.49153$ rad/s (the corresponding non-filtered value being $\omega_{r_2}^{est}=-0.27028$ rad/s). The actual angular position values provided for reference at first and second time instances in the third subfigure are $\phi_1^{est}=259.2444°$ and $\phi_2^{est}=257.8381°$.

Different types of synchronous motors use different dq conventions. The system of FIG. 1 is configured to align the d-axis along the least magnetic reluctance path $L'_d > L'_q$, where $L'_d$ and $L'_q$ are the inductances along the d- and q-axes, respectively. This results in positive saliency $\Delta L' = L'_d - L'_q$. This convention applies for many types of synchronous motors, e.g., SynRM and PMaSynRM. However, IPM motors rely more on permanent magnet (PM) torque than reluctance torque and the typical convention there is to align the d-axis along the PM flux path. This is usually the negative saliency path. In conclusion, the system of FIG. 1 cannot be used as such (without modifications) with IPM motors.

Figure 4:
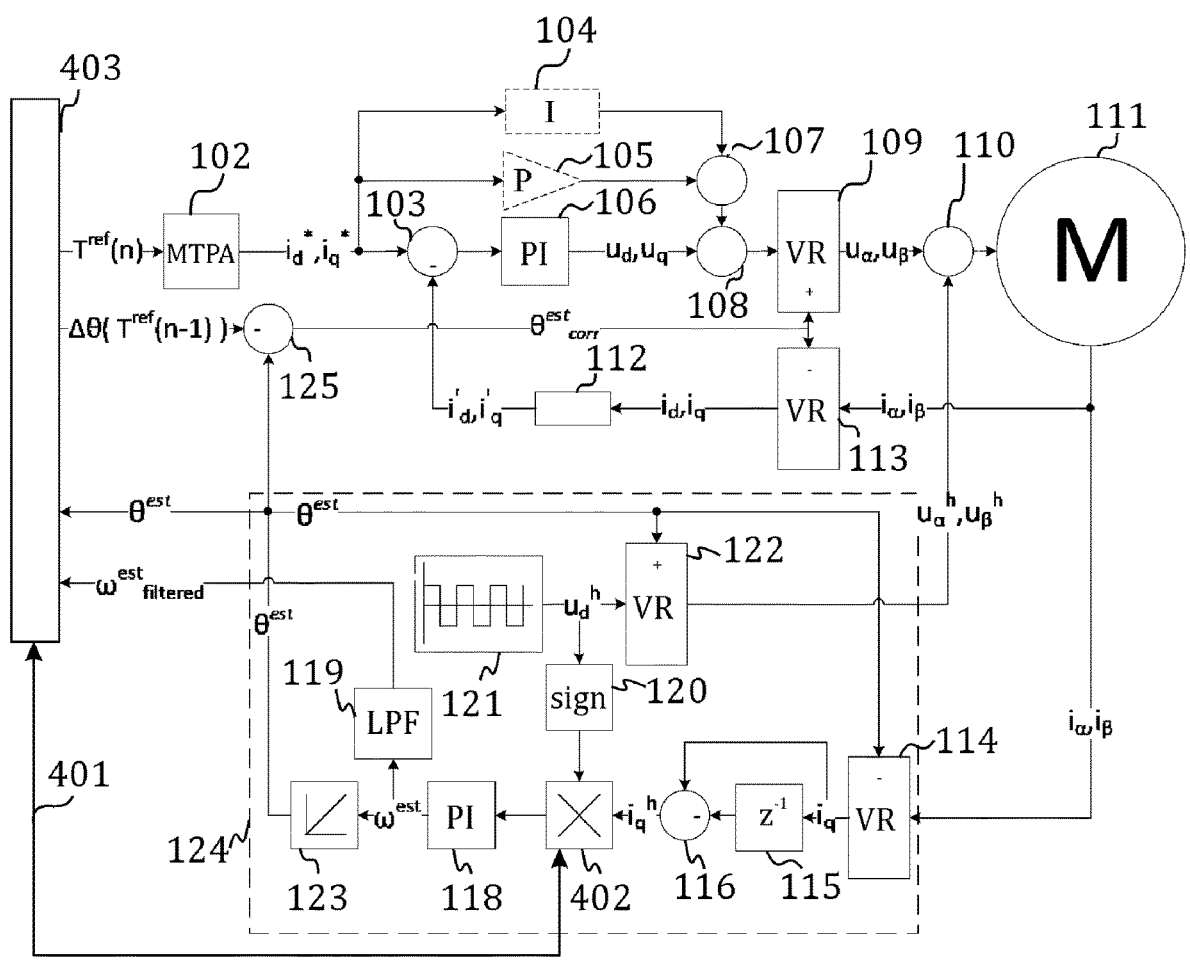
FIG. 4 illustrates an alternative exemplary industrial system according to one embodiment.

FIG. 4 illustrates an alternative, more generic system according to embodiments for overcoming the aforementioned incompatibility with the IPM motors. The system of FIG. 4 corresponds to the system of FIG. 1 apart from one minor (but important) change illustrated with elements 401, 402, 403. Namely, the system of FIG. 1 is adapted in FIG. 4 by enabling the system (or specifically the $\Delta\theta$ estimator state machine 403) to switch the sign of the result of the multiplication in the multiplication element 402 by including a correction term y in the multiplication. The correction term y may have a value of +1 or −1 depending on the type of the synchronous motor. The information on which sign to use at a given time may be maintained in the database of the $\Delta\theta$ estimator state machine 403. The $\Delta\theta$ estimator state machine 403 may control the switching of the sign in the multiplication element 402. In other words, the following multiplication may be carried out in element 402 of FIG. 4:

$$e = \mathrm{signum}\,(u_d^h)i_q^h y,$$

$$\text{where } y = \begin{cases} 1 & \text{for synchronous motors of first type} \\ -1 & \text{for synchronous motors of second type} \end{cases}.$$

As implied above, the synchronic machines of the first type comprise at least SynRMs and PMaSynRMs while the synchronic machines of the second type comprise at least IPM motors. In all other aspects, the system of FIG. 4 may correspond to the system of FIG. 1 and thus the operation of the system of FIG. 4 is not discussed here in full for brevity.

As mentioned above, the rotor of the synchronous motor should preferably move as little as possible during the angular position error estimation procedure. In other words, the initial angular position of the rotor before applying a pre-defined pulsating torque signal should be as close as possible to the final angular position of the rotor after the applying the pre-defined pulsating torque signal. However, it may occur in some circumstances that there is a significant deviation between these two positions and thus the accuracy of the calculated error in the estimated angular position is compromised.

Figure 5:
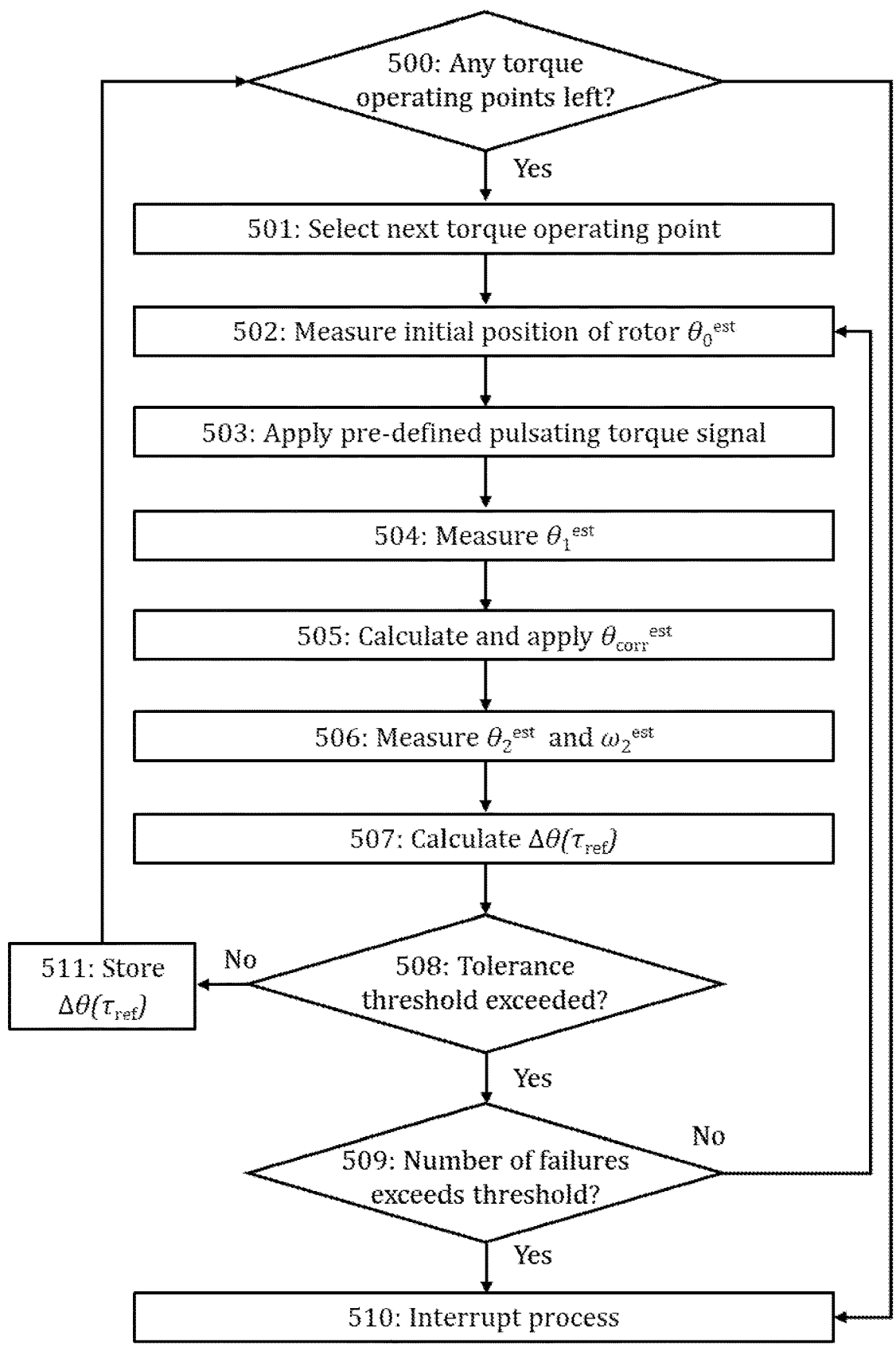
FIGS. 5 and 6 illustrate processes according to embodiments.

FIG. 5 illustrates a process according to embodiments for performing measurements for one or more torque operating points (preferably, a plurality of torque operating points) so as to also overcome the problem outlined in the previous paragraph. The process may be carried out by the system of FIG. 1 or 4. Specifically, the process may be carried out by the Δθ estimator state machine 101 of FIG. 1 or the Δθ estimator state machine 403 of FIG. 4. In some embodiments, the process may be carried out by a drive. In the following, the entity carrying out the process is called simply an apparatus.

Referring to FIG. 5, the apparatus initially checks, in block 500, whether any torque operating points of the one or more torque operating points for which angular position error estimation has not been carried out still remain. If at least one torque operating point remains to be analyzed, the apparatus selects, in block 501, the next torque operation point $\tau_{ref}$ (in order) for which angular position error estimation is to be performed. Initially when no measurements have yet been performed, the action in block 501 may correspond simply to selection of first of the one or more torque operation points. This first of the one or more torque operation points may be the lowest torque operating point. If the one or more torque operating points comprises a plurality of torque operating points, the plurality of pre-defined pulsating torque signals corresponding to the plurality of torque operating points may be applied sequentially in order of increasing torque operating point (i.e., increasing torque level). In other embodiments, other order may be employed, as discussed above.

Then, the apparatus measures, in block 502, a zeroth value of an estimated angular position of the rotor of the synchronous motor $\theta_0^{est}$ (at a zeroth time instance). This measurement is specifically performed before any torque signal is applied to the synchronous motor. The measurement may be performed based on the high-frequency voltage injected to the stator of the synchronous motor, as described above. Also as described above, a corresponding zeroth value of desired torque and/or an estimated angular speed of the rotor may also be measured in some embodiments.

After measuring the zeroth value(s), the apparatus applies, in block 503, the pre-defined pulsating torque corresponding to the selected torque operating point to the synchronous motor. This may be carried out as described in relation to FIG. 1.

Also similar to as described in relation to FIG. 1, the apparatus measures, in block 504, a first value of the estimated angular position $\theta_1^{est}$ at a first time instance during the application of the pre-defined pulsating torque signal. Further, the apparatus calculates, in block 505, a corrected value for the estimated angular position $\theta_{corr}^{est}$ and applies, also in block 505, said value to the vector control (i.e., at least to the Park transforms in the forward part of the vector control). The corrected value may be calculated as described in connection with subtraction element 125 of FIG. 1. Namely, it may be calculated, for the initial value, based on a pre-defined value for the error in the estimated angular position (e.g., zero assuming that the first torque operating point is relatively low). For the subsequent torque operating point(s), one of the aforementioned equations $$\theta_{corr}^{est}(\tau(n)) = \theta^{est} - \Delta\theta(\tau(n-1))x \text{ or}$$

$$\theta_{corr}^{est}(\tau(n)) = \theta^{est} - \Delta\theta(\tau(n))x$$

may be employed (with extrapolation being used for calculating Δθ(τ(n)) in the latter equation).

At a second time instance, the apparatus measures, in block 506, both a second value of the estimated angular position $\theta_2^{est}$ and a second value of the estimated angular speed $\omega_{r_2}^{est}$. As described above, the second time instance correspond to a time instance following the applying of the pre-defined pulsating torque signal. Based on the values measured in block 505, 506, the apparatus calculates, in block 507, error in the estimated angular position $\Delta\theta(\tau_{ref})$ (or specifically, the error in the first value of the estimated angular position).

The apparatus compares, in block 508, an absolute difference between the zeroth value of the estimated angular position and an error-corrected first value of the estimated angular position against a first pre-defined threshold (i.e., a tolerance threshold). The error-corrected first value of the estimated angular position is defined as $\phi_{r_1}^{est} = \theta_2^{est} - \omega_{r_2}^{est} \Delta t$, where $\theta_2^{est}$ is the second value of the estimated angular position, $\omega_{r_2}^{est}$ is the second value of the estimated angular speed and Δt is a duration between the first and second time instances. In other words, the following equation is evaluated in block 508

$$|\phi_{r_1}^{est} - \theta_0^{est}| > \theta_{threshold},$$

where $\theta_{threshold}$ is the first pre-defined threshold.

In response to the absolute difference failing to exceed the first pre-defined threshold ($|\phi_{r_1}^{est} - \theta_0^{est}| \leq \theta_{threshold}$), the apparatus stores, in block 511, the error in the estimated angular position for the current torque operating point (and possibly also information on the torque operating point and/or measurement data) to a lookup table in a database and proceeds to perform angular position error estimation for a next torque operating point of the one or more torque operating points for which data is not yet stored to the lookup table, if any such a torque operating point remain in block 500. In other words, the error estimation is considered a success and the process proceed further.

In response to said absolute difference exceeding the first pre-defined threshold ($|\phi_{r_1}^{est} - \theta_0^{est}| > \theta_{threshold}$) (i.e., the error estimation is deemed a failure), the apparatus may, first, check whether the number of failures of the absolute difference between the zeroth value of the estimated angular position and the first value of the estimated angular position to exceed the first pre-defined threshold exceeds a second pre-defined threshold in block 509. If this is not the case, the apparatus repeats the angular position error estimation without changing the torque operating point (i.e., repeats at least blocks 502 to 508). If the number of failures exceeds the second pre-defined threshold, the apparatus may interrupt or stop, in block 510, the angular position error estimation process. The apparatus may also interrupt the angular position error estimation process also if no torque operating points are no longer left for angular position error estimation (i.e., if all the one or more torque operating points have been covered) in block 500.

In some embodiments, the check in block 509 may be omitted. In some simpler embodiments, also the tolerance checking functionalities in block 502, 508 may omitted so that it is assumed that all the calculated $\Delta\theta(\tau_{ref})$ in block 507 are valid and are thus stored in block 511 to the lookup table.

After the angular position error estimation process of FIG. 5 has finished, the apparatus may operate the synchronous motor at the one or more torque operating points (or specifically within a range covered by the one or more torque operating points) using the sensorless vector control method employing high-frequency voltage injection. In said operating at the one or more torque operating points, any error in the angular position of the synchronous motor may be corrected according to the lookup table.

Figure 6:
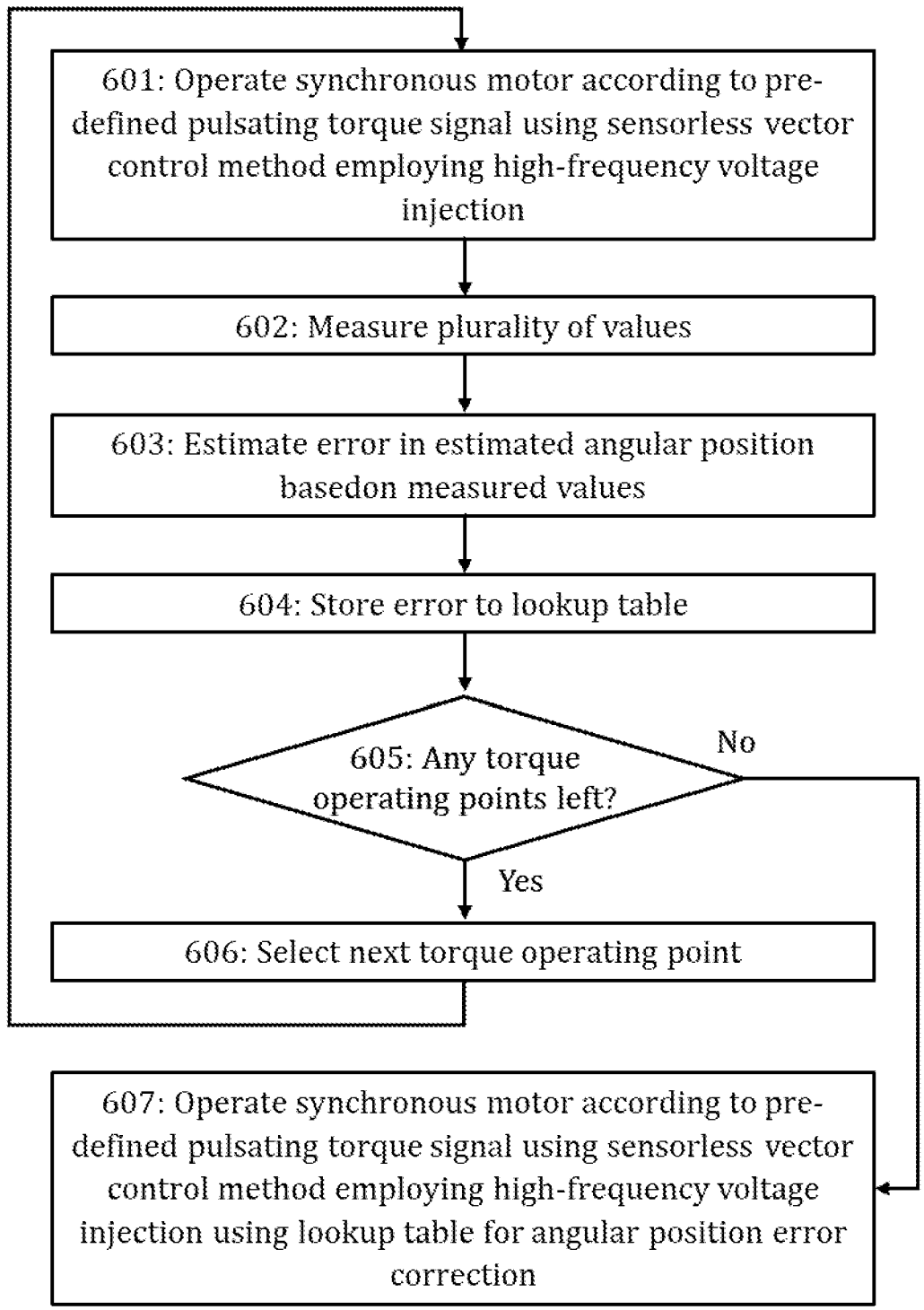

FIG. 6 illustrates a simplistic process according to embodiments for performing angular position error estimation and control of a synchronous motor according to results of the angular position error estimation. The process may be carried out by the system of FIG. 1 or 4. Specifically, the process may be carried out by the $\Delta\theta$ estimator state machine 101 of FIG. 1 or the $\Delta\theta$ estimator state machine 403 of FIG. 4. In some embodiments, the process may be carried out by a drive. In the following, the entity carrying out the process is called simply an apparatus.

The apparatus performs, sequentially for each of one or more torque operating points of a synchronous motor, angular position error estimation of the synchronous motor in the following manner (blocks 601 to 606). The one or more torque operating points and the associated one or more pre-defined pulsating torque signals and the order in which they are applied in the angular position error estimation may be defined as described in relation to FIG. 5.

To perform the angular position error estimation for a particular torque operating point, the apparatus operates, in block 601, the synchronous motor according to a pre-defined pulsating torque signal using a sensorless vector control method employing high-frequency voltage injection. Here, a peak amplitude of the pre-defined pulsating torque signal corresponds to a torque operating point of the synchronous motor and the pre-defined pulsating torque signal has a zero mean for minimizing movement of a rotor of the synchronous motor during the operating. The operating in block 601 may correspond, for example, to blocks 503, 505 of FIG. 5. The apparatus measures, in block 602, based on a high-frequency component of an output stator current signal received from the synchronous motor (i.e., during the operating), a plurality of values comprising at least a first value of an estimated angular position of a rotor of the synchronous motor ($\theta_1^{est}$) at a first time instance corresponding substantially to an end point of the pre-defined pulsating torque signal (e.g., the last point of the pre-defined pulsating torque signal corresponding to non-zero torque), a second value of the estimated angular position of the rotor ($\theta_2^{est}$) at a second time instance occurring a pre-defined time ($\Delta t$) after the first time instance and a second value of an estimated angular speed ($\omega_{r_2}^{est}$) at the second time instance.

The measuring in block 602 may correspond to blocks 504, 506 of FIG. 5. The estimated angular speed may correspond to a measured angular speed after lowpass-filtering (as discussed in relation to element 119 of FIG. 1).

The apparatus estimates, in block 603, an error in the first value of the estimated angular position of the rotor based on the plurality of values and stores at least the error in the estimated angular position to a lookup table in a database. Specifically, the error ($\Delta\theta$) in the first value of the estimated angular position may be evaluated in block 603 according to $\Delta\theta = \theta_1^{est} - \theta_2^{est} + \omega_{r_2}^{est}\Delta t$. The estimating in block 603 may correspond to block 507 of FIG. 5.

After the storing of the error to the lookup table in block 604, the apparatus selects, in block 608, the next torque operating point for angular position error estimation (if any exist in block 607). The angular position error estimation loop (blocks 601 to 606) is repeated for each of the one or more torque operating points.

After the angular position error estimation has been carried out for all of the one or more torque operating points in blocks 601 to 606, the apparatus operates, in block 607, the synchronous motor at the one or more torque operating points (or specifically within a range covered by the one or more torque operating points) using the sensorless vector control method with high-frequency voltage injection. In the operating, any error in the angular position of the synchronous motor is corrected according to the lookup table.

The blocks, related functions, and information exchanges described above by means of FIGS. 1, 4 to 6 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Any of the features described above in connection with the more detailed embodiments of FIGS. 1 to 5 may be combined with the embodiment of FIG. 6.

Figure 7:
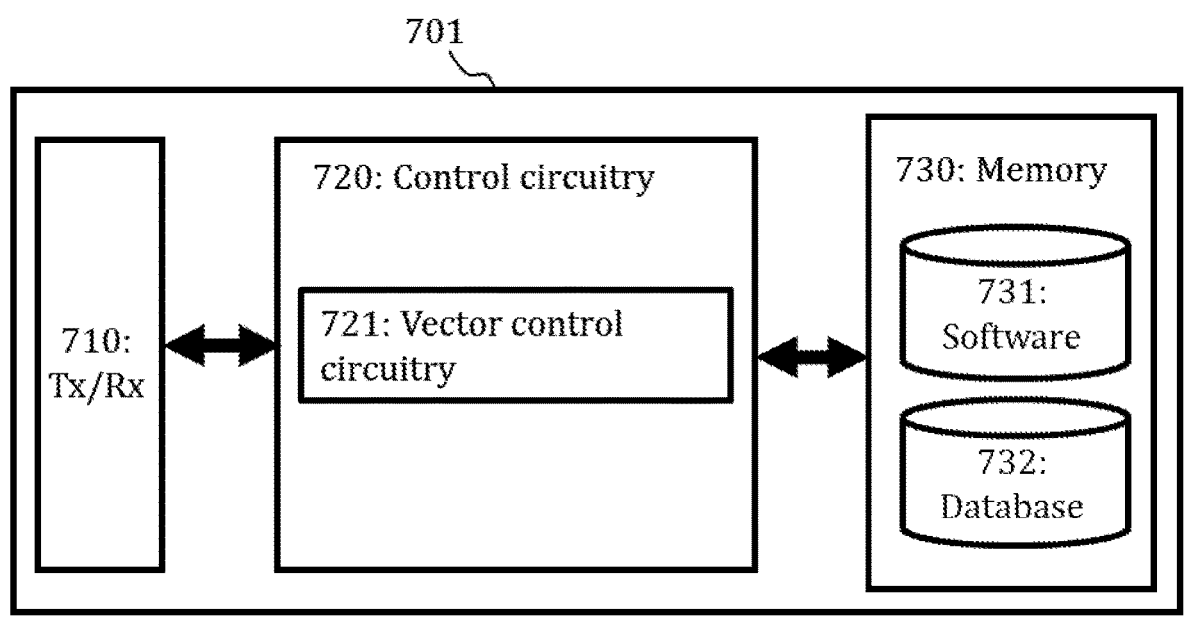
FIG. 7 illustrates an apparatus according to one embodiment.

FIG. 7 provides an apparatus 701 at least for performing angular position error estimation for vector control of synchronous motors. Specifically, FIG. 7 may illustrate a drive (or a sub-unit thereof) for performing angular position error estimation for vector control of synchronous motors and the vector control itself (using high-frequency voltage injection) based on the angular position error estimation. In some embodiments, the apparatus 701 may correspond to the system of FIG. 1 excluding the synchronous motor 111 or to the system of FIG. 4 excluding the synchronous motor 111.

The apparatus 701 may comprise one or more control circuitry 720, such as at least one processor, and at least one memory 730, including one or more algorithms 731, such as a computer program code (software) wherein the at least one memory and the computer program code (software) are configured, with the at least one processor, to cause the apparatus to carry out any one of the exemplified functionalities of the apparatus (i.e., of the system of FIG. 1 or 4) described above. Said at least one memory 730 may also comprise at least one database 732.

Referring to FIG. 7, the one or more communication control circuitry 720 comprise at least vector control circuitry 721 which is configured to perform angular position error estimation and vector control of a synchronous motor taking into account results of the angular position error estimation. To this end, the vector control circuitry 721 is configured to carry out at least some of the functionalities described above by means of any of FIGS. 1 to 6 using one or more individual circuitries. Specifically, the vector control circuitry 721 may implement any of elements 101 to 110 and 112 to 125 of FIG. 1 and/or any of elements 102 to 110, 112 to 116, 118 to 125 and 401 to 403 of FIG. 4.

Referring to FIG. 7, the memory 730 may be implemented using any suitable data storage technology, such as semiconductor based memory devices, flash memory, magnetic memory devices and systems, optical memory devices and systems, fixed memory and removable memory.

Referring to FIG. 7, the apparatus 701 may further comprise different interfaces 710 such as an interface to a stator of a synchronous motor and optionally one or more signaling interfaces (TX/RX) comprising hardware and/or software for realizing communication connectivity according to one or more communication protocols. The one or more signaling interfaces 710 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 1 to 6 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 6 or operations thereof.

Embodiments as described may also be carried out in the form of a computer process defined by a computer program or portions thereof. Embodiments of the methods described in connection with FIGS. 1 to 6 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly, and they are intended to illustrate, not to restrict, the embodiment.

The invention claimed is:

1. An apparatus comprising:
means for performing angular position error estimation, sequentially for each of one or more torque operating points of a synchronous motor, by
operating the synchronous motor according to a pre-defined pulsating torque signal using a sensorless vector control method with high-frequency voltage injection, wherein a peak amplitude of the pre-defined pulsating torque signal corresponds to a torque operating point of the synchronous motor and the pre-defined pulsating torque signal has a zero mean,
measuring, based on a high-frequency component of an output stator current signal received from the synchronous motor, at least
a first value of an estimated angular position of a rotor of the synchronous motor, $\theta_1^{est}$, at a first time instance corresponding to an end point of the pre-defined pulsating torque signal,
a second value of the estimated angular position, $\theta_2^{est}$, at a second time instance occurring a pre-defined time, $\Delta t$, after the first time instance and
a second value of an estimated angular speed, $\omega_{r_2}^{est}$, at the second time instance,
estimating an error, $\Delta\theta$, in the first value of the estimated angular position as $\Delta\theta = \theta_1^{est} - \theta_2^{est} + \omega_{r_2}^{est}\Delta t$ and
storing at least the error in the estimated angular position to a lookup table in a database; and
means for operating, following the angular position error estimation, the synchronous motor at the one or more torque operating points using the sensorless vector control method with high-frequency voltage injection, wherein any error in the angular position of the synchronous motor is corrected, in the operating at the one or more torque operating points, according to the lookup table.

2. The apparatus according to claim 1, wherein the one or more torque operating points comprise a plurality of torque operating points.

3. The apparatus according to claim 2, wherein any error in the angular position of the synchronous motor is corrected, in the operating according to the pre-defined pulsating torque signal, by:

calculating a corrected estimated angular position for the torque operating point $\tau(n)$ according to $$\theta_{corr}^{est}(\tau(n)) = \theta^{est} - \Delta\theta(\tau_{closest})x,$$

wherein $\theta^{est}$ is a value of a current estimated angular position as evaluated by the vector control method, $\tau$ is a value of torque associated with the torque operating point, $\Delta\theta(\tau_{closest})$ is a value of the error in the estimated angular position calculated for a previous torque operating point closest to the torque operating point and maintained in the lookup table, n denotes the nth torque operating point of the one or more torque operating points and x is defined as $$x = \begin{cases} 1 & \text{for } \tau > 0 \\ 0 & \text{for } \tau = 0 \\ -1 & \text{for } \tau < 0 \end{cases};$$

using the corrected estimated angular position in the sensorless vector control method.

4. The apparatus according to claim 1, wherein any error in the angular position of the synchronous motor is corrected, in the operating at the one or more torque operating points following the angular position error estimation, according to the lookup table by:

calculating a corrected estimated angular position for the torque operating point $\tau(n)$ according to $$\theta_{corr}^{est}(\tau(n)) = \theta^{est} - \Delta\theta(\tau(n))x,$$

wherein $\theta^{est}$ is a value of a current estimated angular position as evaluated by the vector control method, $\tau$ is a value of torque associated with the torque operating point, $\Delta\theta(\tau(n))$ is a value of the error in the estimated angular position maintained in the lookup table, n denotes the nth torque operating point of the one or more torque operating points and x is defined as $$x = \begin{cases} 1 & \text{for } \tau > 0 \\ 0 & \text{for } \tau = 0 \\ -1 & \text{for } \tau < 0 \end{cases}; \text{ and}$$

using the corrected estimated angular position in the sensorless vector control method.

5. The apparatus according to claim 1, wherein the one or more torque operating points comprise at least three torque operating points and any error in the angular position of the synchronous motor is corrected, in the operating according to the pre-defined pulsating torque signal, by:

calculating a corrected estimated angular position for the torque operating point $\tau(n)$ according to $$\theta_{corr}^{est}(\tau(n)) = \theta^{est} - \Delta\theta(\tau(n))x,$$

wherein $\theta^{est}$ is a value of a current estimated angular position as evaluated by the vector control method, $\tau$ is a value of torque associated with a torque operating point, $\Delta\theta(\tau(n))$ is a value of the error in the estimated angular position for the torque operating point $\tau(n)$, n denotes the nth torque operating point of the at least three torque operating points and x is defined as $$x = \begin{cases} 1 & \text{for } \tau > 0 \\ 0 & \text{for } \tau = 0 \\ -1 & \text{for } \tau < 0 \end{cases},$$

the term $\Delta\theta(\tau(n))$ being calculated by linearly extrapolating or interpolating values of the error in the estimated angular position calculated for previous torque operating points and maintained in the lookup table; and using the corrected estimated angular position in the sensorless vector control method.

6. The apparatus according to claim 1, wherein the means for performing the angular position error estimation are configured to perform the operating of the synchronous motor according to the pre-defined pulsating torque signal, for each of one or more torque operating points of the synchronous motor by:

generating d- and q-axis stator current signals based on the pre-defined pulsating torque pulse signal;

calculating a first difference signal as a difference between a generated d-axis stator current signal and a measured d-axis stator current signal of the synchronous motor and a second difference signal as a difference between a generated q-axis stator current signal and a measured q-axis output stator current signal of the synchronous motor;

calculating, using a first proportional-integral, PI, controller, d-axis stator voltage signal based on the first difference signal and a q-axis stator voltage signal based on the second difference signal;

converting the d- and a q-axis stator voltage signals to $\alpha$- and $\beta$-axis stator voltage signals using inverse Park transform; and applying the $\alpha$- and $\beta$-axis stator voltage signals to a stator of the synchronous motor.

7. The apparatus according to claim 6, wherein the means for performing the angular position error estimation are configured to acquire the measured q-axis output stator current signal by:

receiving $\alpha$- and $\beta$-axis output stator current signals from the synchronous motor;

generating d-axis and q-axis output stator current signals based on the $\alpha$- and $\beta$-axis output stator current signals using Park transform based on a previously estimated value of the estimated angular position of the rotor; and calculating a time-average over each of the d- and q-axis output stator current signals.

8. The apparatus according to claim 1, wherein the means for means for operating the synchronous motor at the one or more torque operating points are configured to perform the high-frequency voltage injection by:

generating a high-frequency square-wave d-axis or q-axis stator voltage signal having a frequency larger than a frequency of the pre-defined pulsating torque signal;

converting the square wave d-axis stator voltage signal to high-frequency $\alpha$- and $\beta$-axis stator voltage signals using inverse Park transform based on a previously estimated value of the estimated angular position of the rotor; and injecting the high-frequency α- and β-axis stator voltage signals to the α- and β-axis stator voltage signals to be fed to the synchronous motor.

9. The apparatus according to claim 1, wherein the means for performing the angular position error estimation are configured to perform the operating of the synchronous motor according to the pre-defined pulsating torque signal by performing, for each of one or more torque operating points of the synchronous motor:
  receiving α- and β-axis output stator current signals from the synchronous motor;
  generating a q-axis output stator current signal based on the α- and βaxis output stator current signals using Park transform based on a previously estimated value of the estimated angular position of the rotor;
  high-pass filtering the q-axis output stator current signal to isolate a high-frequency q-axis output stator current component resulting from the high-frequency voltage injection;
  calculating a product of the high-frequency q-axis output stator current component and a signal formed by applying a signum function to the high-frequency square-wave d-axis stator voltage signal;
  calculating, using a second PI controller, a first signal corresponding to the estimated angular speed based on said product;
  integrating the first signal corresponding to the estimated angular speed over time to form a signal corresponding to the estimated angular position; and
  low-pass filtering the first signal corresponding to the estimated angular speed to form a second signal corresponding to the estimated angular speed.

10. The apparatus according to claim 1, wherein the means for performing the angular position error estimation are configured to perform the operating of the synchronous motor according to the pre-defined pulsating torque signal using the sensorless vector control method employing the high-frequency voltage injection by performing, for each of one or more torque operating points of the synchronous motor:
  receiving α- and β-axis output stator current signals from the synchronous motor;
  generating a q-axis output stator current signal based on the α- and βaxis output stator current signals using Park transform based on a previously estimated value of the estimated angular position of the rotor;
  high-pass filtering the q-axis output stator current signal to isolate a high-frequency q-axis output stator current component, wherein the high-frequency q-axis output stator current component corresponds to a response to the high-frequency square-wave d-axis stator current signal fed to the synchronous motor;
  calculating a product of the high-frequency q-axis output stator current component, a signal formed by applying a signum function to the high-frequency square-wave d-axis stator voltage signal and a correction term maintained in the database, wherein the correction term has value of +1 or −1 depending on the type of the synchronous motor;
  calculating, using a second PI controller, a first signal corresponding to the estimated angular speed based on said product;
  integrating the first signal corresponding to the estimated angular speed over time to form a signal corresponding to the estimated angular position; and
  low-pass filtering the first signal corresponding to the estimated angular speed to form a second signal corresponding to the estimated angular speed.

11. The apparatus according to claim 1, wherein the one or more torque operating points comprise a plurality of torque operating points and the means for performing the angular position error estimation are further configured to perform, for each of the one or more torque operating points:
  measuring, before the operating of the synchronous motor according to the pre-defined pulsating torque signal, a zeroth value of the estimated angular position;
  comparing an absolute difference between the zeroth value of the estimated angular position and an error-corrected first value of the estimated angular position against a first pre-defined threshold, wherein the error-corrected first value of the estimated angular position is defined as $\phi_{r_1}^{est} = \theta_2^{est} - \omega_{r_2}^{est}\Delta t$;
  in response to the absolute difference failing to exceed the first pre-defined threshold, performing the storing and proceeding to perform angular position error estimation for a next torque operating point of the one or more torque operating points for which data is not yet stored to the lookup table, if any such a torque operating point remain; and
  in response to the absolute difference exceeding the first pre-defined threshold, repeating, without changing the torque operating point, the angular position error estimation.

12. The apparatus according to claim 11, wherein the means for performing the angular position error estimation are further configured to perform, for each of the one or more torque operating points:
  in response to the number of failures of the absolute difference between the zeroth value of the estimated angular position and the first value of the estimated angular position to exceed the first pre-defined threshold exceeding a second pre-defined threshold, stopping the angular position error estimation.

13. The apparatus according to claim 1, wherein the pre-defined pulsating torque signal comprises one or more positive square pulses and one or more negative square pulses arranged in such an order that total movement of the rotor during an application of the pre-defined pulsating torque signal is minimized.

14. A drive for driving a synchronous motor, the drive comprising an apparatus comprising:
  means for performing angular position error estimation, sequentially for each of one or more torque operating points of the synchronous motor, by
    operating the synchronous motor according to a pre-defined pulsating torque signal using a sensorless vector control method with high-frequency voltage injection, wherein a peak amplitude of the pre-defined pulsating torque signal corresponds to a torque operating point of the synchronous motor and the pre-defined pulsating torque signal has a zero mean,
    measuring, based on a high-frequency component of an output stator current signal received from the synchronous motor, at least
      a first value of an estimated angular position of a rotor of the synchronous motor, $\theta_1^{est}$, at a first time instance corresponding to an end point of the pre-defined pulsating torque signal,
      a second value of the estimated angular position, $\theta_2^{est}$, at a second time instance occurring a pre-defined time, $\Delta t$, after the first time instance and a second value of an estimated angular speed, $\omega_{r_2}^{est}$, at the second time instance, estimating an error, $\Delta\theta$, in the first value of the estimated angular position as $\Delta\theta = \theta_1^{est} - \theta_2^{est} + \omega_{r_2}^{est}\Delta t$ and storing at least the error in the estimated angular position to a lookup table in a database; and means for operating, following the angular position error estimation, the synchronous motor at the one or more torque operating points using the sensorless vector control method with high-frequency voltage injection, wherein any error in the angular position of the synchronous motor is corrected, in the operating at the one or more torque operating points, according to the lookup table.

15. A method comprising:

performing, sequentially for each of one or more torque operating points of a synchronous motor, angular position error estimation by:

operating the synchronous motor according to a pre-defined pulsating torque signal using a sensorless vector control method with high-frequency voltage injection, wherein a peak amplitude of the pre-defined pulsating torque signal corresponds to a torque operating point of the synchronous motor and the pre-defined pulsating torque signal has a zero mean;

measuring, based on a high-frequency component of an output stator current signal received from the synchronous motor, at least a first value of an estimated angular position of a rotor of the synchronous motor, $\theta_1^{est}$, at a first time instance corresponding to an end point of the pre-defined pulsating torque signal, a second value of the estimated angular position, $\theta_2^{est}$, at a second time instance occurring a pre-defined time, $\Delta t$, after the first time instance and a second value of an estimated angular speed, $\omega_{r_2}^{est}$, at the second time instance;

estimating an error, $\Delta\theta$, in the first value of the estimated angular position as $\Delta\theta = \theta_1^{est} - \theta_2^{est} + \omega_{r_2}^{est}\Delta t$; and storing at least the error in the estimated angular position to a lookup table in a database, the method further comprising, following the angular position error estimation:

operating the synchronous motor at the one or more torque operating points using the sensorless vector control method with high-frequency voltage injection, wherein any error in the angular position of the synchronous motor is corrected, in the operating at the one or more torque operating points, according to the lookup table.

* * * * *